US011383760B2

(12) United States Patent
Nakade et al.

(10) Patent No.: US 11,383,760 B2
(45) Date of Patent: Jul. 12, 2022

(54) STEERING SYSTEM

(71) Applicant: JTEKT CORPORATION, Osaka (JP)

(72) Inventors: Tomohiro Nakade, Sakurai (JP); Yuta Sakai, Toyota (JP); Robert Fuchs, Nara (JP); Naoki Shoji, Shiki-gun (JP)

(73) Assignee: JTEKT CORPORATION, Kariya (JP)

( * ) Notice: Subject to any disclaimer, the term of this patent is extended or adjusted under 35 U.S.C. 154(b) by 233 days.

(21) Appl. No.: 16/785,731

(22) Filed: Feb. 10, 2020

(65) Prior Publication Data

US 2020/0269906 A1    Aug. 27, 2020

(30) Foreign Application Priority Data

Feb. 21, 2019 (JP) .............................. JP2019-029571

(51) Int. Cl.
*B62D 5/04* (2006.01)
*B62D 6/10* (2006.01)
*B62D 15/02* (2006.01)

(52) U.S. Cl.
CPC ......... *B62D 5/0463* (2013.01); *B62D 5/0409* (2013.01); *B62D 6/10* (2013.01); *B62D 15/0235* (2013.01)

(58) Field of Classification Search
CPC .... B62D 5/001; B62D 5/0409; B62D 5/0463; B62D 6/10; B62D 15/0235
See application file for complete search history.

(56) References Cited

U.S. PATENT DOCUMENTS

| | | | | |
|---|---|---|---|---|
| 6,176,341 B1 * | 1/2001 | Ansari | .................. | B62D 5/001 |
| | | | | 180/402 |
| 6,554,094 B1 * | 4/2003 | Bell | ...................... | B62D 6/002 |
| | | | | 180/402 |
| 7,191,864 B2 * | 3/2007 | Sugitani | ................. | B62D 6/008 |
| | | | | 180/402 |
| 7,249,650 B2 * | 7/2007 | Fukushima | ........... | B62D 5/006 |
| | | | | 180/402 |
| 2021/0031827 A1 * | 2/2021 | Karve | .................... | B62D 6/008 |
| 2021/0269086 A1 * | 9/2021 | Anraku | ................ | B62D 5/0424 |

FOREIGN PATENT DOCUMENTS

| | | |
|---|---|---|
| EP | 2 851 267 A1 | 3/2015 |
| EP | 2 905 204 A1 | 8/2015 |
| EP | 3 309 044 A1 | 4/2018 |
| JP | 2004-224238 A | 8/2004 |

OTHER PUBLICATIONS

Jul. 14, 2020 Extended European Search Report issued in European Patent Application No. 20157686.5.

* cited by examiner

*Primary Examiner* — Tony H Winner
(74) *Attorney, Agent, or Firm* — Oliff PLC

(57) ABSTRACT

A steering system includes: a steering member; a steering operation mechanism; a reaction force motor; a steering motor; a steering torque sensor; a command value setting circuit; a reaction force command value calculation circuit configured to calculate a reaction force command value; a steering operation command value calculation circuit configured to calculate a steering operation command value based on a steering operation steering angle command value and a manual steering angle command value; a reaction force control circuit configured to cause a rotation angle of the reaction force motor to follow the reaction force command value; and a steered angle control circuit configured to cause a rotation angle of the steering motor to follow the steering operation command value.

5 Claims, 8 Drawing Sheets

STEERING SYSTEM

CROSS-REFERENCE TO RELATED APPLICATION

This application claims priority to Japanese Patent Application No. 2019-029571 filed on Feb. 21, 2019, incorporated herein by reference in its entirety.

BACKGROUND

1. Technical Field

The disclosure relates to steering systems in which a steering operation mechanism is driven by a steering motor with the steering operation mechanism not being mechanically linked to a steering member that is operated for steering.

2. Description of Related Art

Japanese Unexamined Patent Application Publication No. 2004-224238 (JP 2004-224238 A) discloses a steer-by-wire system in which a steering operation mechanism is driven by a steering motor with the steering operation mechanism not being mechanically linked to a steering member that is operated for steering. The steer-by-wire system described in JP 2004-224238 A includes an operation unit having an operation reaction force motor, a steering unit having a steering motor, an operation reaction force control unit for controlling the operation unit, and a steering control unit for controlling the steering unit, and an automatic following system. The steering control unit controls the steering motor based on a final target steered angle.

In the automatic following system described in JP 2004-224238 A, the final target steered angle is set as follows. When the automatic following system is not in operation, a target steered angle calculated based on the operation angle of an operation steering wheel is set as the final target steered angle. When the automatic following system is in operation and steering torque is equal to or larger than a first threshold value, or when the automatic following system is in operation and the operation angle is equal to or larger than a second threshold value, the target steered angle calculated based on the operation angle of the operation steering wheel multiplied by a predetermined value larger than 1 is set as the final target steered angle. When the automatic following system is in operation, the steering torque is smaller than the first threshold value, and the operation angle is smaller than the second threshold value, a target steered angle set by the automatic following system is set as the final target steered angle.

SUMMARY

In the steer-by-wire system described in JP 2004-224238 A, the driver's intention will not be reflected in the target steered angle during autonomous steering control in which the automatic following system is in operation until the steering torque becomes equal to or larger than the first threshold value or the operation angle becomes equal to or larger than the second threshold value. The disclosure can immediately reflect the driver's intention in a steering motor and a reaction force motor during autonomous steering control.

An aspect of the disclosure is a steering system. The steering system includes: a steering member; a steering operation mechanism mechanically separated from the steering member; a reaction force motor configured to apply reaction torque to the steering member; a steering motor configured to drive the steering operation mechanism; a steering torque sensor configured to detect steering torque applied to the steering member; a command value setting circuit configured to set a manual steering angle command value based on the steering torque; a reaction force command value calculation circuit configured to calculate a reaction force command value based on a reaction force steering angle command value and the manual steering angle command value; a steering operation command value calculation circuit configured to calculate a steering operation command value based on a steering operation steering angle command value and the manual steering angle command value; a reaction force control circuit configured to cause a rotation angle of the reaction force motor to follow the reaction force command value; and a steered angle control circuit configured to cause a rotation angle of the steering motor to follow the steering operation command value.

With the above configuration, the reaction force command value is calculated by adding the manual steering angle command value to the reaction force steering angle command value, and the rotation angle of the reaction force motor is caused to follow the reaction force command value. The steering operation command value is calculated by adding the manual steering angle command value to the steering operation steering angle command value, and the rotation angle of the steering motor is caused to follow the steering operation command value. The driver's intention can thus be immediately reflected in the steering motor and the reaction force motor during autonomous steering control. Accordingly, cooperative control can be implemented which allows manual steering to be performed while performing steering control (steering operation control and reaction force control) mainly by autonomous steering control without switching steering control between manual steering control and autonomous steering control. Since steering control can be seamlessly shifted between manual steering control and autonomous steering control, the driver will not feel discomfort during manual steering.

The steering system may further include: a steering determination circuit configured to determine whether the steering member is being steered; and a switching circuit configured to set the reaction force steering angle command value to zero when the steering determination circuit determines that the steering member is not being steered.

In the steering system, the reaction force steering angle command value and the steering operation steering angle command value may be a common autonomous steering angle command value.

In the steering system, the steering operation mechanism may include a first steering operation mechanism configured to steer a first steered wheel and a second steering operation mechanism configured to steer a second steered wheel. The steering motor may include a first steering motor that drives the first steering operation mechanism and a second steering motor that drives the second steering operation mechanism. The steering operation command value calculation circuit may include a first steering operation command value calculation circuit and a second steering operation command value calculation circuit. The first steering operation command value calculation circuit is configured to calculate a first steering operation command value based on the manual steering angle command value and a first steering operation steering angle command value for steering the first steered wheel, and the second steering operation command value calculation circuit is configured to calculate a second steering operation command value based on the manual steering angle command value and a second steering operation steering angle command value for steering the second steered wheel. The steered angle control circuit may include a first steered angle control circuit and a second steered angle control circuit. The first steered angle control circuit is configured to cause a rotation angle of the first steering motor to follow the first steering operation command value, and the second steered angle control circuit is configured to cause a rotation angle of the second steering motor to follow the second steering operation command value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
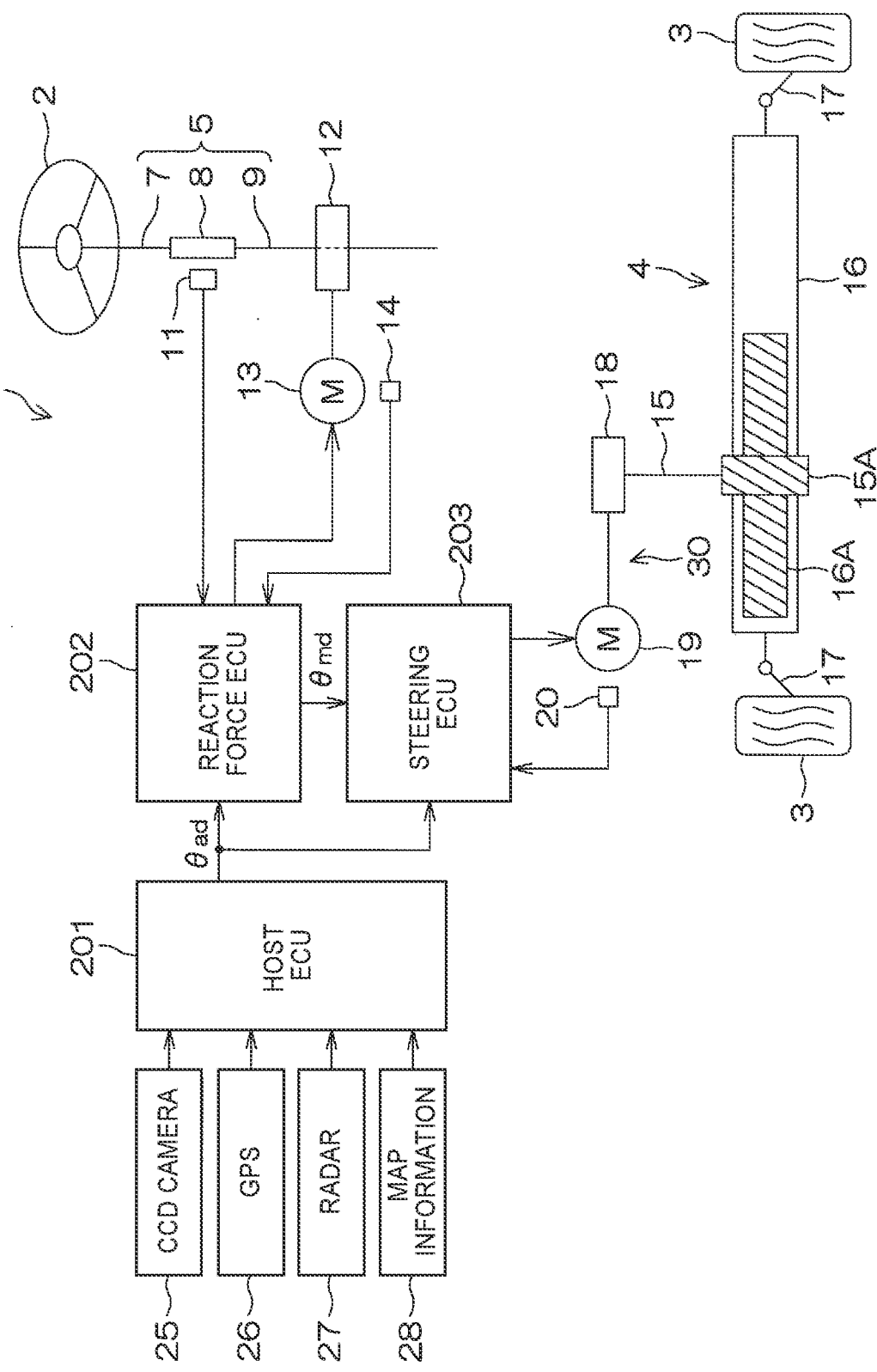
FIG. 1 is a schematic diagram illustrating a schematic configuration of a steering system according to a first embodiment of the disclosure.

Embodiments of the disclosure will be described in detail below with reference to the accompanying drawings. FIG. 1 is a schematic diagram illustrating a schematic configuration of a steering system according to a first embodiment of the disclosure. The steering system 1 includes a steering wheel 2 that is a steering member for steering a vehicle, a steering operation mechanism 4 for steering steered wheels 3, and a steering shaft 5 connected to the steering wheel 2. There is no such mechanical linkage between the steering shaft 5 and the steering operation mechanism 4 that allows movement such as torque and rotation to be transmitted therebetween.

The steering shaft 5 includes a first shaft 7, a torsion bar 8, and a second shaft 9. The first shaft 7 has its one end connected to the steering wheel 2. The torsion bar 8 has its one end connected to the other end of the first shaft 7. The second shaft 9 has its one end connected to the other end of the torsion bar 8. A torque sensor 11 is disposed near the torsion bar 8. The torque sensor 11 detects steering torque $T_d$ applied to the steering wheel 2, based on the relative rotational displacement between the first shaft 7 and the second shaft 9. In the present embodiment, it is assumed that the steering torque $T_d$ detected by the torque sensor 11 is positive when it is torque for steering to the left, and is negative when it is torque for steering to the right, and that the larger the absolute value of the detected steering torque $T_d$ is, the larger the magnitude of the steering torque $T_d$ is.

A reaction force motor 13 for controlling the rotation angle of the second shaft 9 (hereinafter sometimes referred to as "steering wheel angle") is connected to the second shaft 9 via a speed reducer 12. The reaction force motor 13 is an electric motor for applying reaction torque to the second shaft 9. The speed reducer 12 is comprised of a worm gear mechanism including a worm shaft (not shown) and a worm wheel (not shown) meshing with the worm shaft. The worm shaft is connected to an output shaft of the reaction force motor 13 such that the worm shaft can rotate with the output shaft of the reaction force motor 13. The worm wheel is connected to the second shaft 9 such that the worm wheel can rotate with the second shaft 9. The reaction force motor 13 is provided with a rotation angle sensor 14 for detecting the rotation angle of the reaction force motor 13.

The steering operation mechanism 4 is comprised of a rack and pinion mechanism including a pinion shaft 15 and a rack shaft 16. Each of the steered wheels 3 is connected to a corresponding one of the ends of the rack shaft 16 via a tie rod 17 and a knuckle arm (not shown). The pinion shaft 15 is connected to an output shaft of a steering motor 19 via a speed reducer 18. The speed reducer 18 is comprised of a worm gear mechanism including a worm shaft (not shown) and a worm wheel (not shown) meshing with the worm shaft. The worm shaft is connected to the output shaft of the steering motor 19 such that the worm shaft can rotate with the output shaft of the steering motor 19. The worm wheel is connected to the pinion shaft 15 such that the worm wheel can rotate with the pinion shaft 15. A pinion 15A is connected to the tip end of the pinion shaft 15. The steering motor 19 is provided with a rotation angle sensor 20 for detecting the rotation angle of the steering motor 19.

In the following description, the reduction ratio (gear ratio) of the speed reducer 12 is sometimes represented by $N_1$, and the reduction ratio of the speed reducer 18 is sometimes represented by $N_2$. The reduction ratio is defined as a ratio $\omega_{wg}/\omega_{ww}$ of an angular velocity $\omega_{wg}$ of the worm gear to an angular velocity $\omega_{ww}$ of the worm wheel. The rack shaft 16 extends linearly in the lateral direction of the vehicle. The rack shaft 16 has a rack 16A meshing with the pinion 15A. When the steering motor 19 rotates, its rotational force is transmitted to the pinion shaft 15 via the speed reducer 18. Rotation of the pinion shaft 15 is converted to axial movement of the rack shaft 16 by the pinion 15A and the rack 16A. The steered wheels 3 are thus steered.

The vehicle is equipped with a charge coupled device (CCD) camera 25, a global positioning system (GPS) 26, a radar 27, and a map information memory 28. The CCD camera 25 captures images of a road ahead in the traveling direction of the vehicle. The GPS 26 detects the position of the vehicle. The radar 27 detects road shapes and obstacles. The map information memory 28 has map information stored therein. The CCD camera 25, the GPS 26, the radar 27, and the map information memory 28 are connected to a host electronic control unit (ECU) 201 for performing driver assistance control and autonomous driving control. The host ECU 201 perceives the surrounding environment, estimates the position of the vehicle, plans a route, etc. based on the information obtained by the CCD camera 25, the GPS 26, and the radar 27 and the map information obtained from the map information memory 28 and determines control target values of steering operation and a driving actuator.

In the present embodiment, the host ECU 201 sets an autonomous steering angle command value $\theta_{ad}$ for autonomous steering. In the present embodiment, autonomous steering control is, e.g., control for moving the vehicle along a target path. The autonomous steering angle command value $\theta_{ad}$ is a target value of the steering angle for autonomously moving the vehicle along a target path. Since the process of setting such an autonomous steering angle command value $\theta_{ad}$ is well-known in the art, detailed description thereof will be omitted. The autonomous steering angle command value $\theta_{ad}$ is an example of a "reaction force steering angle command value" and a "steering operation steering angle command value."

In the present embodiment, the autonomous steering angle command value $\theta_{ad}$, and an assist torque command value $T_{ac}$ and a manual steering angle command value $\theta_{md}$ which will be described later are set to positive values when the second shaft 9 is rotated in the left steering direction by the reaction force motor 13 or when the steered wheels 3 are steered in the left steering direction by the steering motor 19. These command values $\theta_{ad}$, $T_{ac}$, and $\theta_{md}$ are set to negative values when the second shaft 9 is rotated in the right steering direction by the reaction force motor 13 or when the steered wheels 3 are steered in the right steering direction by the steering motor 19. In the present embodiment, the autonomous steering angle command value $\theta_{ad}$ is set as the rotation angle of the pinion shaft 15, and the manual steering angle command value $\theta_{fd}$ is set as the rotation angle of the second shaft 9.

The autonomous steering angle command value $\theta_{ad}$ set by the host ECU 201 is input to a reaction force ECU 202 and a steering ECU 203 via an on-board network. The reaction force ECU 202 is an ECU for controlling the reaction force motor 13, and the steering ECU 203 is an ECU for controlling the steering motor 19. The steering torque $T_d$ detected by the torque sensor 11 and an output signal of the rotation angle sensor 14 are input to the reaction force ECU 202. The reaction force ECU 202 controls the reaction force motor 13 based on these input signals and information received from the host ECU 201.

Figure 2:
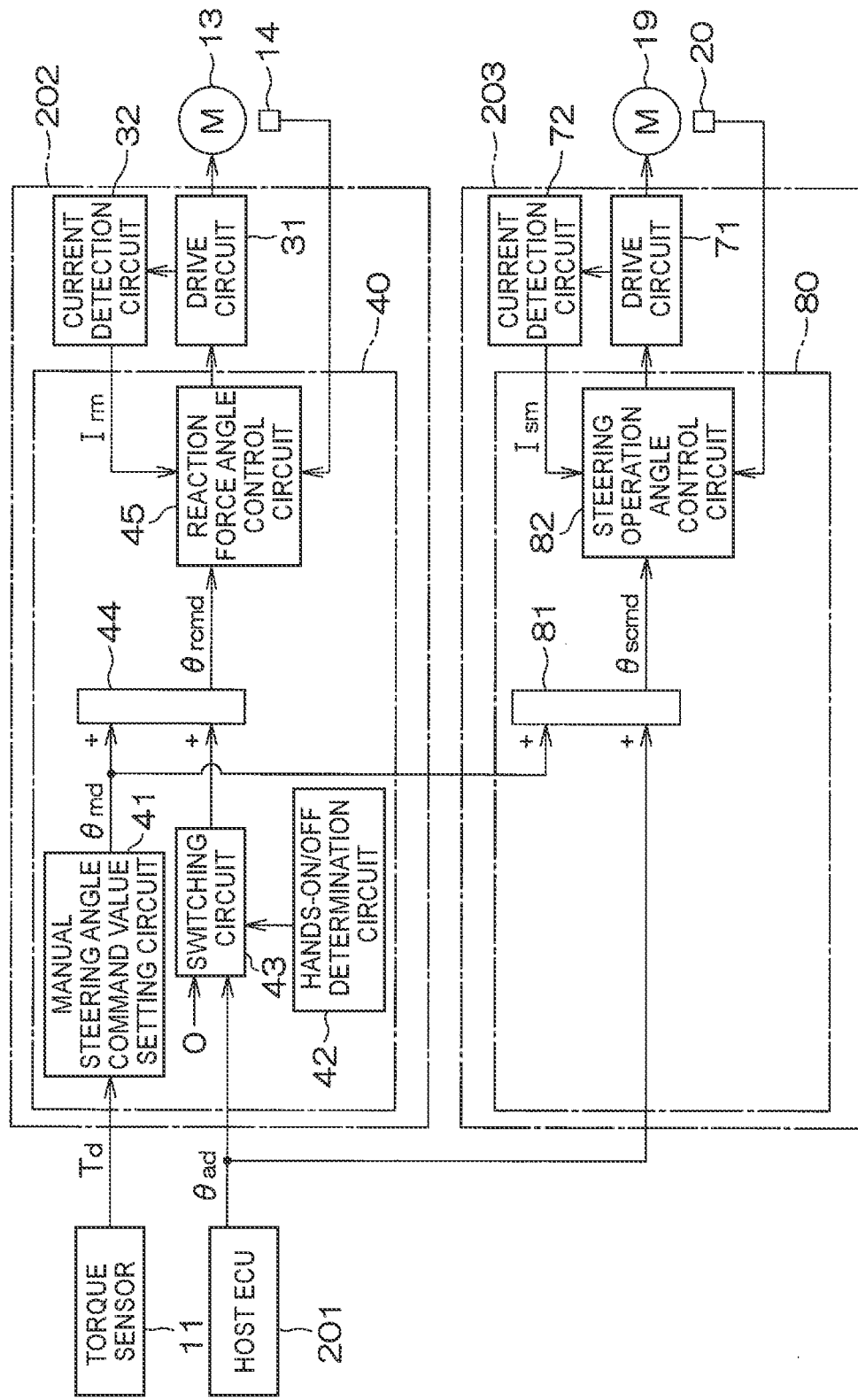
FIG. 2 is a block diagram illustrating an electrical configuration of a reaction force ECU and a steering ECU.

An output signal of the rotation angle sensor 20 is input to the steering ECU 203. The steering ECU 203 controls the steering motor 19 based on the output signal of the rotation angle sensor 20, information received from the reaction force ECU 202, and information received from the host ECU 201. FIG. 2 is a block diagram illustrating the electrical configuration of the reaction force ECU 202 and the steering ECU 203.

The reaction force ECU 202 includes a microcomputer 40, a drive circuit (inverter circuit) 31, and a current detection circuit 32. The drive circuit 31 is controlled by the microcomputer 40 to supply electric power to the reaction force motor 13. The current detection circuit 32 detects a current flowing in the reaction force motor 13 (hereinafter referred to as a "motor current $I_m$"). The microcomputer 40 includes a central processing unit (CPU) and memories (a read only memory (ROM), a random access memory (RAM), a non-volatile memory, etc.). The microcomputer 40 functions as a plurality of function processing units by executing a predetermined program. The plurality of function processing units include a manual steering angle command value setting circuit 41, a hands-on/off determination circuit 42, a switching circuit 43, a reaction force integrated angle command value calculation circuit 44, and a reaction force angle control circuit 45. The reaction force angle control circuit 45 is an example of the "reaction force control circuit" of the disclosure.

The manual steering angle command value setting circuit 41 sets the steering angle (more precisely, the rotation angle of the second shaft 9) as the manual steering angle command value $\theta_{md}$ according to the operation of the steering wheel 2 when the driver operates the steering wheel 2. The manual steering angle command value setting circuit 41 sets the manual steering angle command value $\theta_{md}$ using the steering torque $T_d$ detected by the torque sensor 11. The manual steering angle command value setting circuit 41 will be described in detail later. The manual steering angle command value $\theta_{md}$ set by the manual steering angle command value setting circuit 41 is input to the reaction force integrated angle command value calculation circuit 44.

The hands-on/off determination circuit 42 determines whether the driver is holding the steering wheel 2 (hands-on) or not (hands-off). The hands-on/off determination circuit 42 can be a circuit that determines whether the driver's hands are on or off the steering wheel 2 based on an output signal of a touch sensor mounted in the steering wheel 2, a circuit that determines whether the driver's hands are on or off the steering wheel 2 based on an image captured by a camera mounted in the vehicle, etc. The hands-on/off determination circuit 42 may have a configuration other than the above configurations as long as it can determine whether the driver's hands are on or off the steering wheel 2. A hands-on/off determination signal output from the hands-on/off determination circuit 42 is input to the switching circuit 43.

When the hands-on/off determination circuit 42 determines that the driver is holding the steering wheel 2, the switching circuit 43 outputs the autonomous steering angle command value $\theta_{ad}$ set by the host ECU 201 to the reaction force integrated angle command value calculation circuit 44. When the hands-on/off determination circuit 42 determines that the driver is not holding the steering wheel 2, the switching circuit 43 outputs zero to the reaction force integrated angle command value calculation circuit 44 as the autonomous steering angle command value $\theta_{ad}$.

The reaction force integrated angle command value calculation circuit 44 calculates a reaction force integrated angle command value $\theta_{rcmd}$ by adding the manual steering angle command value $\theta_{md}$ set by the manual steering angle command value setting circuit 41 to the autonomous steering angle command value $\theta_{ad}$ received from the switching circuit 43. The reaction force angle control circuit 45 controls the angle of the reaction force motor 13 based on the reaction force integrated angle command value $\theta_{rcmd}$. More specifically, the reaction force angle control circuit 45 controls driving of the drive circuit 31 so that a steering angle $\theta_{rt}$ (the rotation angle of the second shaft 9) becomes closer to the reaction force integrated angle command value $\theta_{rcmd}$. The reaction force angle control circuit 45 will be described in detail later.

The steering ECU 203 includes a microcomputer 80, a drive circuit (inverter circuit) 71, and a current detection circuit 72. The drive circuit 71 is controlled by the microcomputer 80 to supply electric power to the steering motor 19. The current detection circuit 72 detects a current flowing in the steering motor 19 (hereinafter referred to as a "motor current $I_{sm}$"). The microcomputer 80 includes a CPU and memories (a ROM, a RAM, a non-volatile memory, etc.). The microcomputer 80 functions as a plurality of function processing units by executing a predetermined program. The plurality of function processing units include a steering operation integrated angle command value calculation circuit 81 and a steering operation angle control circuit 82. The steering operation angle control circuit 82 is an example of a "steered angle control circuit" of the disclosure.

The steering operation integrated angle command value calculation circuit 81 calculates a steering operation integrated angle command value $\theta_{scmd}$ by adding the manual steering angle command value $\theta_{md}$ set by the manual steering angle command value setting circuit 41 of the reaction force ECU 202 to the autonomous steering angle command value $\theta_{ad}$ set by the host ECU 201. The steering operation angle control circuit 82 controls the angle of the steering motor 19 based on the steering operation integrated angle command value $\theta_{scmd}$. More specifically, the steering operation angle control circuit 82 controls driving of the drive circuit 71 so that a steered angle $\theta_{sp}$ (the rotation angle of the pinion shaft 15) becomes closer to the steering operation integrated angle command value $\theta_{scmd}$. The steering operation angle control circuit 82 will be described in detail later.

Figure 3:
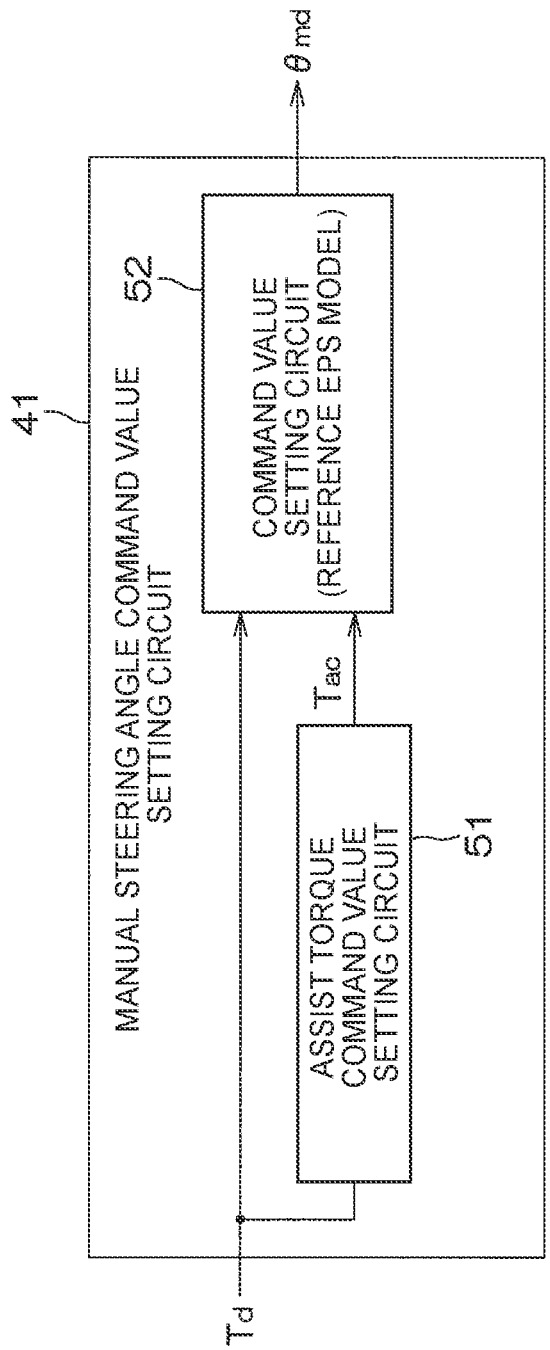
FIG. 3 is a block diagram illustrating a configuration of a manual steering angle command value setting circuit.
Figure 4:
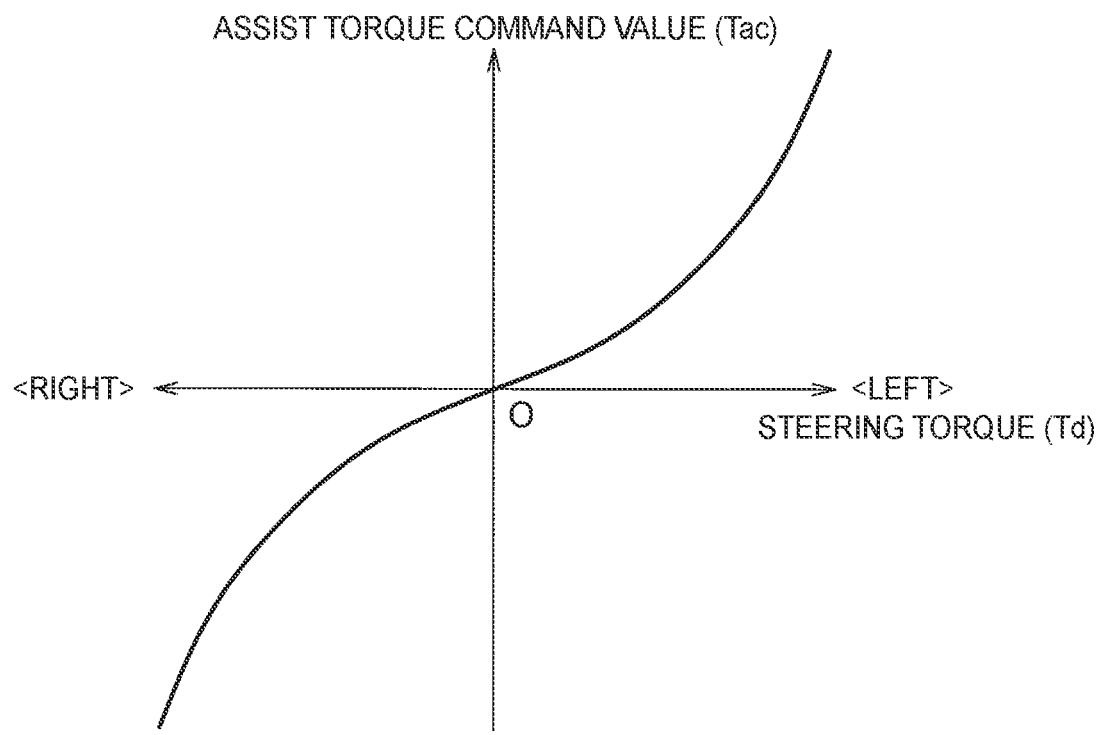
FIG. 4 is a graph illustrating an example of setting an assist torque command value $T_{ac}$ with respect to steering torque $T_d$.

FIG. 3 is a block diagram illustrating the configuration of the manual steering angle command value setting circuit 41. The manual steering angle command value setting circuit 41 includes an assist torque command value setting circuit 51 and a command value setting circuit 52. The assist torque command value setting circuit 51 sets the assist torque command value $T_{ac}$ that is a target value of assist torque necessary for manual operation. The assist torque command value setting circuit 51 sets the assist torque command value $T_{ac}$ based on the steering torque $T_d$ detected by the torque sensor 11. An example of setting the assist torque command value $T_{ac}$ with respect to the steering torque $T_d$ is shown in FIG. 4.

The assist torque command value $T_{ac}$ is positive for positive steering torque $T_d$ and is negative for negative steering torque $T_d$. The assist torque command value $T_{ac}$ is set so that the larger the absolute value of the steering torque $T_d$ is, the larger the absolute value of the assist torque command value $T_{ac}$ is. The assist torque command value setting circuit 51 may calculate the assist torque command value $T_{ac}$ by multiplying the steering torque $T_d$ by a preset constant.

Figure 5:
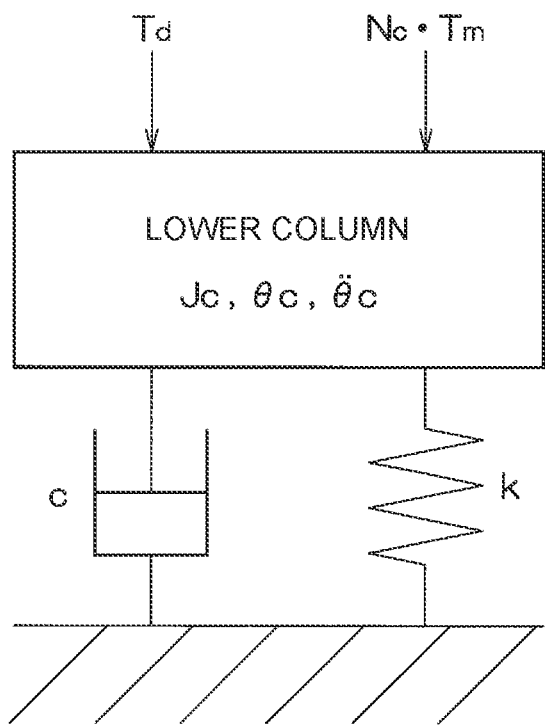
FIG. 5 is a schematic diagram illustrating an example of a reference EPS model used in a command value setting circuit.

In the present embodiment, the command value setting circuit 52 sets a manual steering command value $\theta_{mdac}$ using a reference electric power steering (EPS) model. FIG. 5 is a schematic diagram illustrating an example of the reference EPS model used in the command value setting circuit 52. This reference EPS model is a single inertia model including a lower column. In FIG. 5, Jc represents the inertia of the lower column, θc represents the rotation angle of the lower column, and $T_d$ represents the steering torque. The steering torque $T_d$, torque $N_c \cdot T_m$ from an electric motor (assist motor), and road surface load torque $T_{rl}$ are applied to the lower column. $N_c$ represents the reduction ratio of a speed reducer provided on a transmission path between the assist motor and the lower column, and $T_m$ represents motor torque generated by the assist motor. The road surface load torque $T_{rl}$ is given by the following expression (1) using a spring constant k and a viscous damping coefficient c.

$$T_{rl} = -k \cdot \theta c - c(d\theta c/dt) \quad (1)$$

In the present embodiment, the spring constant k and the viscous damping coefficient c are set to predetermined values calculated in advance by experiments, analyses, etc. An equation of motion of the reference EPS model is given by the following expression (2).

$$Jc \cdot d^2\theta c/dt^2 = T_d + N_c \cdot T_m - k \cdot \theta c - c(d\theta c/dt) \quad (2)$$

The command value setting circuit 52 calculates the rotation angle θc of the lower column by solving the differential equation given by the expression (2) by substituting the steering torque $T_d$ detected by the torque sensor 11 for $T_d$ and substituting the assist torque command value $T_{ac}$ set by the assist torque command value setting circuit 51 for $N_c \cdot T_m$. The command value setting circuit 52 sets the calculated rotation angle θc of the lower column as the manual steering command value $\theta_{md}$.

Figure 6:
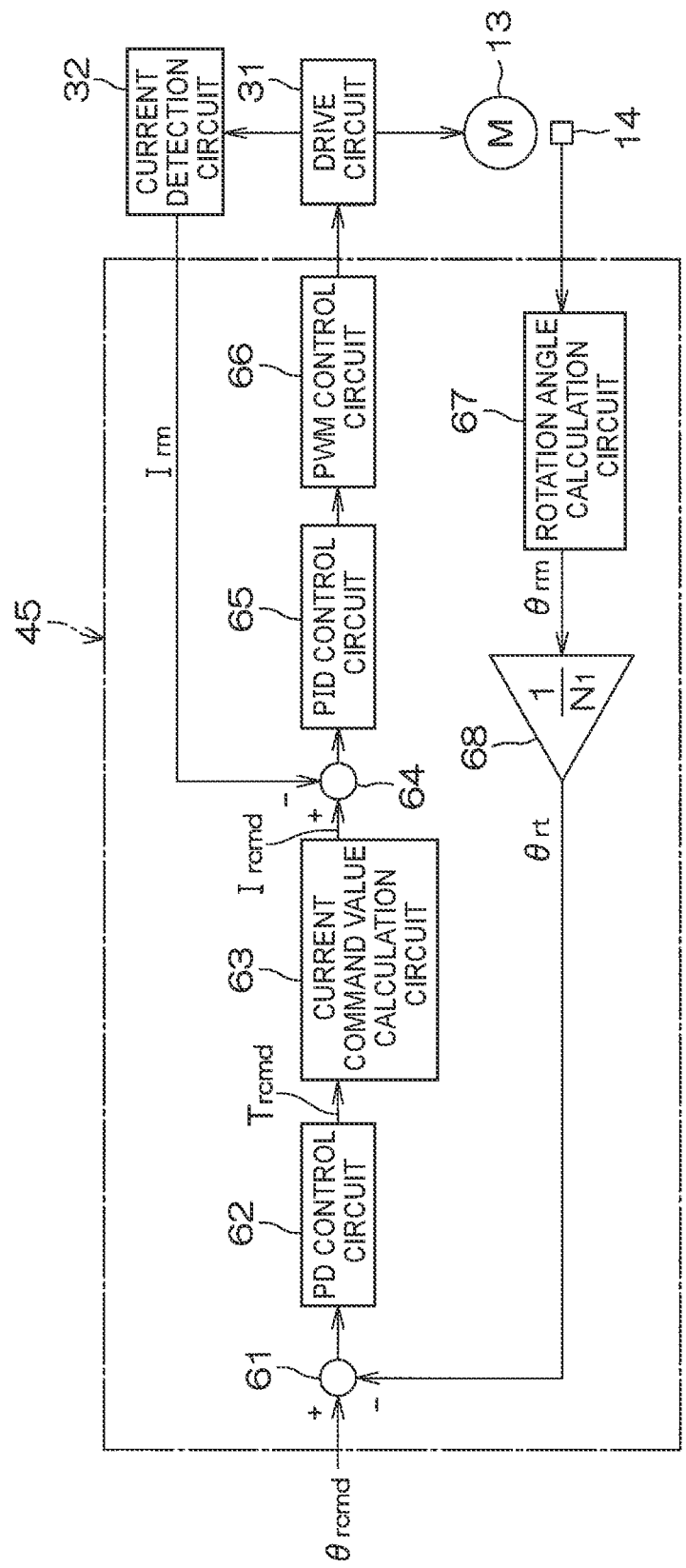
FIG. 6 is a block diagram illustrating the configuration of a reaction force angle control circuit.

FIG. 6 is a block diagram illustrating the configuration of the reaction force angle control circuit 45. The reaction force angle control circuit 45 controls the drive circuit 31 of the reaction force motor 13 based on the reaction force integrated angle command value $\theta_{rcmd}$. The reaction force angle control circuit 45 includes an angle deviation calculation circuit 61, a proportional-derivative (PD) control circuit 62, a current command value calculation circuit 63, a current deviation calculation circuit 64, a proportional-integral-derivative (PID) control circuit 65, a pulse width modulation (PWM) control circuit 66, a rotation angle calculation circuit 67, and a reduction ratio division circuit 68.

The rotation angle calculation circuit 67 calculates a rotor rotation angle $\theta_{rm}$ of the reaction force motor 13 based on the output signal of the rotation angle sensor 14. The reduction ratio division circuit 68 converts the rotor rotation angle $\theta_{rm}$ calculated by the rotation angle calculation circuit 67 to the rotation angle (actual steering angle) $\theta_{rt}$ of the second shaft 9 by dividing the rotor rotation angle $\theta_{rm}$ by the reduction ratio $N_1$ of the speed reducer 12. The angle deviation calculation circuit 61 calculates the deviation $\Delta\theta_r$ ($= \theta_{rcmd} - \theta_{rt}$) between the reaction force integrated angle command value $\theta_{rcmd}$ and the actual steering angle $\theta_{rt}$.

The PD control circuit 62 calculates a torque command value $T_{rcmd}$ for the reaction force motor 13 by performing a proportional-derivative operation (PD operation) on the angle deviation $\Delta\theta_r$ calculated by the angle deviation calculation circuit 61. The current command value calculation circuit 63 calculates a current command value $I_{rcmd}$ by dividing the torque command value $T_{rcmd}$ calculated by the PD control circuit 62 by a torque constant Kr of the reaction force motor 13.

The current deviation calculation circuit 64 calculates the deviation $\Delta I_r$ ($= I_{rcmd} - I_{rm}$) between the current command value $I_{rcmd}$ calculated by the current command value calculation circuit 63 and the motor current $I_{rm}$ detected by the current detection circuit 32. The PID control circuit 65 performs a proportional-integral-derivative operation (PID operation) on a current deviation $\Delta I_r$ calculated by the current deviation calculation circuit 64 to generate a drive command value that controls the motor current $I_{rm}$ flowing in the reaction force motor 13 to the current command value $I_{rcmd}$. The PWM control circuit 66 generates a PWM control signal with a duty ratio corresponding to the drive command value and supplies the generated PWM control signal to the drive circuit 31. Electric power corresponding to the drive command value is thus supplied to the reaction force motor 13.

Figure 7:
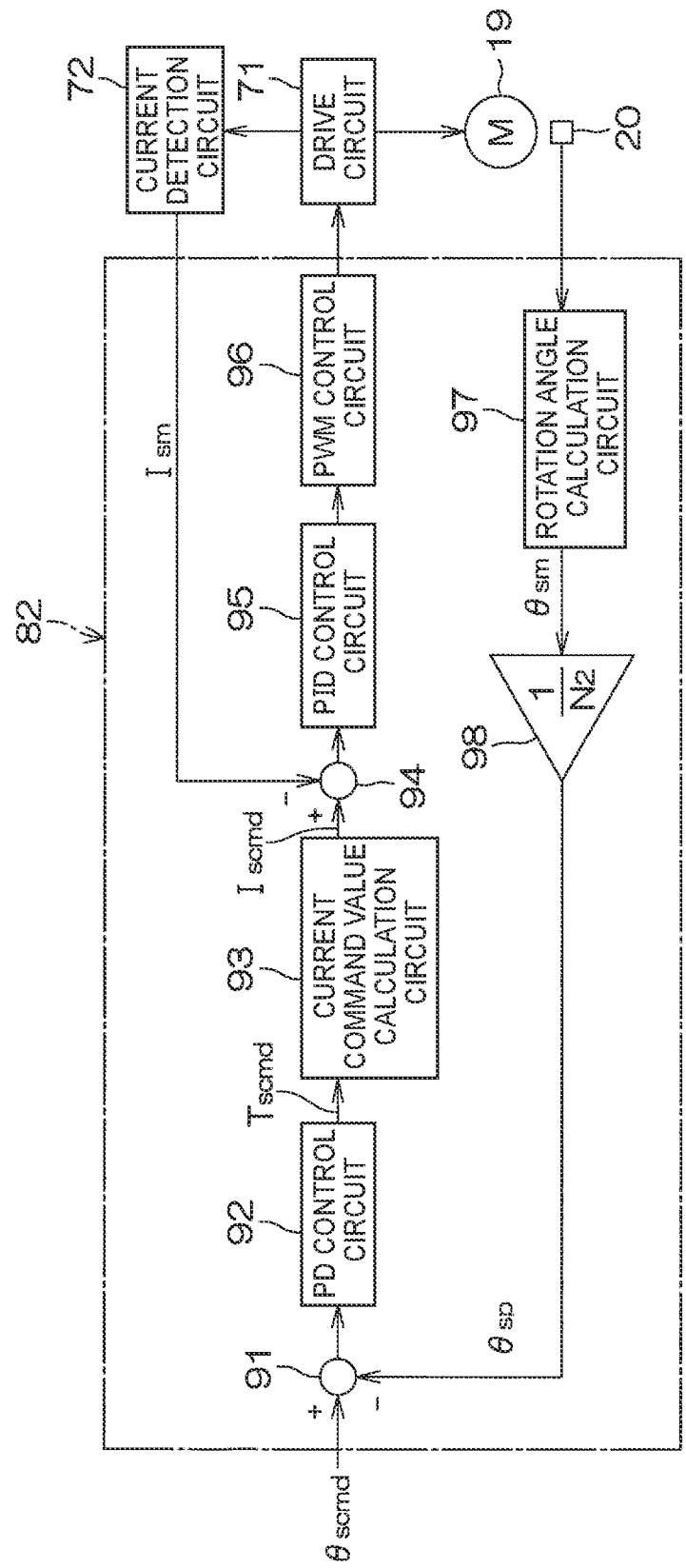
FIG. 7 is a block diagram illustrating the configuration of a steering operation angle control circuit.

FIG. 7 is a block diagram illustrating the configuration of the steering operation angle control circuit 82. The steering operation angle control circuit 82 controls the drive circuit 71 of the steering motor 19 based on the steering operation integrated angle command value $\theta_{scmd}$. The steering operation angle control circuit 82 includes an angle deviation calculation circuit 91, a PD control circuit 92, a current command value calculation circuit 93, a current deviation calculation circuit 94, a PID control circuit 95, a PWM control circuit 96, a rotation angle calculation circuit 97, and a reduction ratio division circuit 98.

The rotation angle calculation circuit 97 calculates a rotor rotation angle $\theta_{sm}$ of the steering motor 19 based on the output signal of the rotation angle sensor 20. The reduction ratio division circuit 98 converts the rotor rotation angle $\theta_{sm}$ calculated by the rotation angle calculation circuit 97 to the rotation angle (actual steered angle) $\theta_{sp}$ of the pinion shaft 15 by dividing the rotor rotation angle $\theta_{sm}$ by the reduction ratio $N_2$ of the speed reducer 18. The angle deviation calculation circuit 91 calculates the deviation $\Delta\theta_s$ ($=\theta_{scmd}-\theta_{sp}$) between the steering operation integrated angle command value $\theta_{scmd}$ and the actual steered angle $\theta_{sp}$.

The PD control circuit 92 calculates a torque command value $T_{scmd}$ for the steering motor 19 by performing a proportional-derivative operation (PD operation) on the angle deviation $\Delta\theta_s$ calculated by the angle deviation calculation circuit 91. The current command value calculation circuit 93 calculates a current command value $I_{scmd}$ by dividing the torque command value $T_{scmd}$ calculated by the PD control circuit 92 by a torque constant Ks of the steering motor 19.

The current deviation calculation circuit 94 calculates the deviation $\Delta I_s$ ($=I_{scmd}-I_{sm}$) between the current command value $I_{scmd}$ calculated by the current command value calculation circuit 93 and the motor current $I_{sm}$ detected by the current detection circuit 72. The PID control circuit 95 performs a proportional-integral-derivative operation (PID operation) on the current deviation $\Delta I_s$ calculated by the current deviation calculation circuit 94 to generate a drive command value that controls the motor current $I_{sm}$ flowing in the steering motor 19 to the current command value $I_{scmd}$. The PWM control circuit 96 generates a PWM control signal with a duty ratio corresponding to the drive command value and supplies the generated PWM control signal to the drive circuit 71. Electric power corresponding to the drive command value is thus supplied to the steering motor 19.

Referring to FIG. 2, when the hands-on/off determination circuit 42 determines that the driver is holding the steering wheel 2, the reaction force integrated angle command value $\theta_{rcmd}$ is calculated by adding the manual steering angle command value $\theta_{md}$ to the autonomous steering angle command value $\theta_{ad}$ set by the host ECU 201, and the reaction force motor 13 is controlled based on the reaction force integrated angle command value $\theta_{rcmd}$. The steering operation integrated angle command value $\theta_{scmd}$ is also calculated by adding the manual steering angle command value % $I_d$ to the autonomous steering angle command value $\theta_{ad}$, and the steering motor 19 is controlled based on the steering operation integrated angle command value $\theta_{scmd}$.

The driver's intention can thus be immediately reflected in the steering motor 19 and the reaction force motor 13 during autonomous steering control. Accordingly, cooperative control can be implemented which allows manual steering to be performed while performing steering control (steering operation control and reaction force control (steering wheel angle control)) mainly by autonomous steering control without switching steering control between manual steering control and autonomous steering control. Since steering control can be seamlessly shifted between manual steering control and autonomous steering control, the driver will not feel discomfort during manual steering.

When the hands-on/off determination circuit 42 determines that the driver is not holding the steering wheel 2, zero is input to the reaction force integrated angle command value calculation circuit 44 as the autonomous steering angle command value $\theta_{ad}$. In this case, the steering motor 19 is controlled based on the steering operation integrated angle command value $\theta_{scmd}$ calculated by adding the manual steering angle command value $\theta_{md}$ to the autonomous steering angle command value $\theta_{ad}$, but the reaction force motor 13 is controlled based on the reaction force integrated angle command value $\theta_{rcmd}$ consisting only of the manual steering angle command value $\theta_{md}$. Since the manual steering angle command value $\theta_{md}$ is approximately zero in this case, the steering wheel 2 is fixed at the neutral position during autonomous steering. This configuration can thus avoid such a situation that the steering wheel 2 is rotated by autonomous steering and the driver is caught by the steering wheel 2 when he/she is not holding the steering wheel 2.

Figure 8:
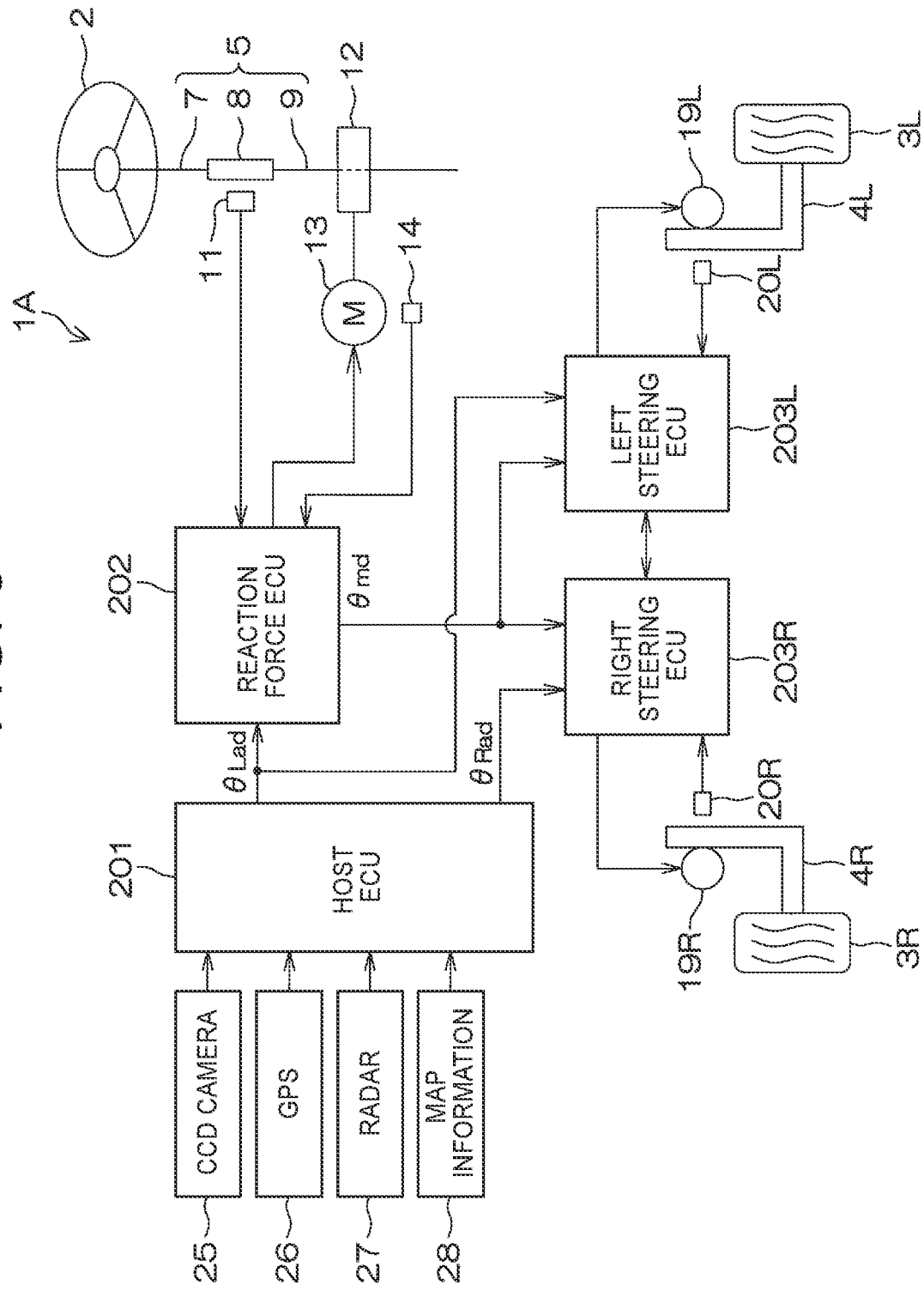
FIG. 8 is a schematic diagram illustrating a schematic configuration of a steering system according to a second embodiment of the disclosure.

FIG. 8 is a schematic diagram illustrating a schematic configuration of a steering system according to a second embodiment of the disclosure. In FIG. 8, the portions corresponding to those in FIG. 1 are denoted by the same reference characters as those in FIG. 1. A steering system 1A of FIG. 8 is a steer-by-wire system using a right and left independent steering operation system. The steering system 1A of FIG. 8 is different from the steering system 1 of FIG. 1 in that the steering system 1A includes two steering operation mechanisms, two steering motors, and two steering ECUs.

Specifically, the steering system 1A includes a left steering operation mechanism 4L for steering a left steered wheel 3L, a right steering operation mechanism 4R for steering a right steered wheel 3R, a left steering motor 19L for driving the left steering operation mechanism 4L via a speed reducer (not shown), and a right steering motor 19R for driving the right steering operation mechanism 4R via a speed reducer (not shown). In the following description, the reduction ratio of the speed reducer connected to the left steering motor 19L is sometimes represented by $N_3$, and the reduction ratio of the speed reducer connected to the right steering motor 19R is sometimes represented by $N_4$. The steering system 1A further includes a left steering ECU 203L for controlling the left steering motor 19L and a right steering ECU 203R for controlling the right steering motor 19R.

There is no such mechanical linkage between the steering shaft 5 and each of the right and left steering operation mechanisms 4R, 4L that allows movement such as torque and rotation to be transmitted therebetween. The left steering motor 19L is provided with a rotation angle sensor 20L for detecting the rotation angle of the left steering motor 19L. The right steering motor 19R is provided with a rotation angle sensor 20R for detecting the rotation angle of the right steering motor 19R.

The host ECU 201 sets a right autonomous steering angle command value $\theta_{Rad}$ and a left autonomous steering angle command value $\theta_{Lad}$ for autonomous steering. The right autonomous steering angle command value $\theta_{Rad}$ is a steering operation autonomous steering angle command value for the right steering motor 19R, and the left autonomous steering angle command value $\theta_{Lad}$ is a steering operation autonomous steering angle command value for the left steering motor 19L. In the present embodiment, one of the right autonomous steering angle command value $\theta_{Rad}$ and the left autonomous steering angle command value $\theta_{Lad}$ (in this example, the left autonomous steering angle command value $\theta_{Lad}$) is also used as a reaction force autonomous steering angle command value for the reaction force motor 13.

The left autonomous steering angle command value $\theta_{Lad}$ set by the host ECU 201 is input to the reaction force ECU 202 and the left steering ECU 203L via an on-board network. The right autonomous steering angle command value $\theta_{Rad}$ set by the host ECU 201 is input to the right steering ECU 203R via the on-board network. In the present embodiment, the right autonomous steering angle command value $\theta_{Rad}$ and the left autonomous steering angle command value $\theta_{Lad}$ are set to positive values when the second shaft 9 is to be rotated in the left steering direction by the reaction force motor 13 or when the steered wheels 3R, 3L are to be steered in the left steering direction by the steering motors 19R, 19L. These command values $\theta_{Rad}$, $\theta_{Lad}$ are set to negative values when the second shaft 9 is to be rotated in the right steering direction by the reaction force motor 13 or when the steered wheels 3R, 3L are to be steered in the right steering direction by the steering motors 19R, 19L. In the present embodiment, the right autonomous steering angle command value $\theta_{Rad}$ and the left autonomous steering angle command value $\theta_{Lad}$ are set as the rotation angles (steered angles) in the right steering operation mechanism 4R and the left steering operation mechanism 4L. A manual steering angle command value $\theta_{md}$ is set as the rotation angle of the second shaft 9.

As in the first embodiment, the reaction force ECU 202 controls the reaction force motor 13 based on steering torque $T_d$ detected by the torque sensor 11, an output signal of the rotation angle sensor 14, and information received from the host ECU 201. An output signal of the rotation angle sensor 20L is input to the left steering ECU 203L. The left steering ECU 203L controls the left steering motor 19L based on the output signal of the rotation angle sensor 20L, information received from the reaction force ECU 202, and information received from the host ECU 201.

Figure 9:
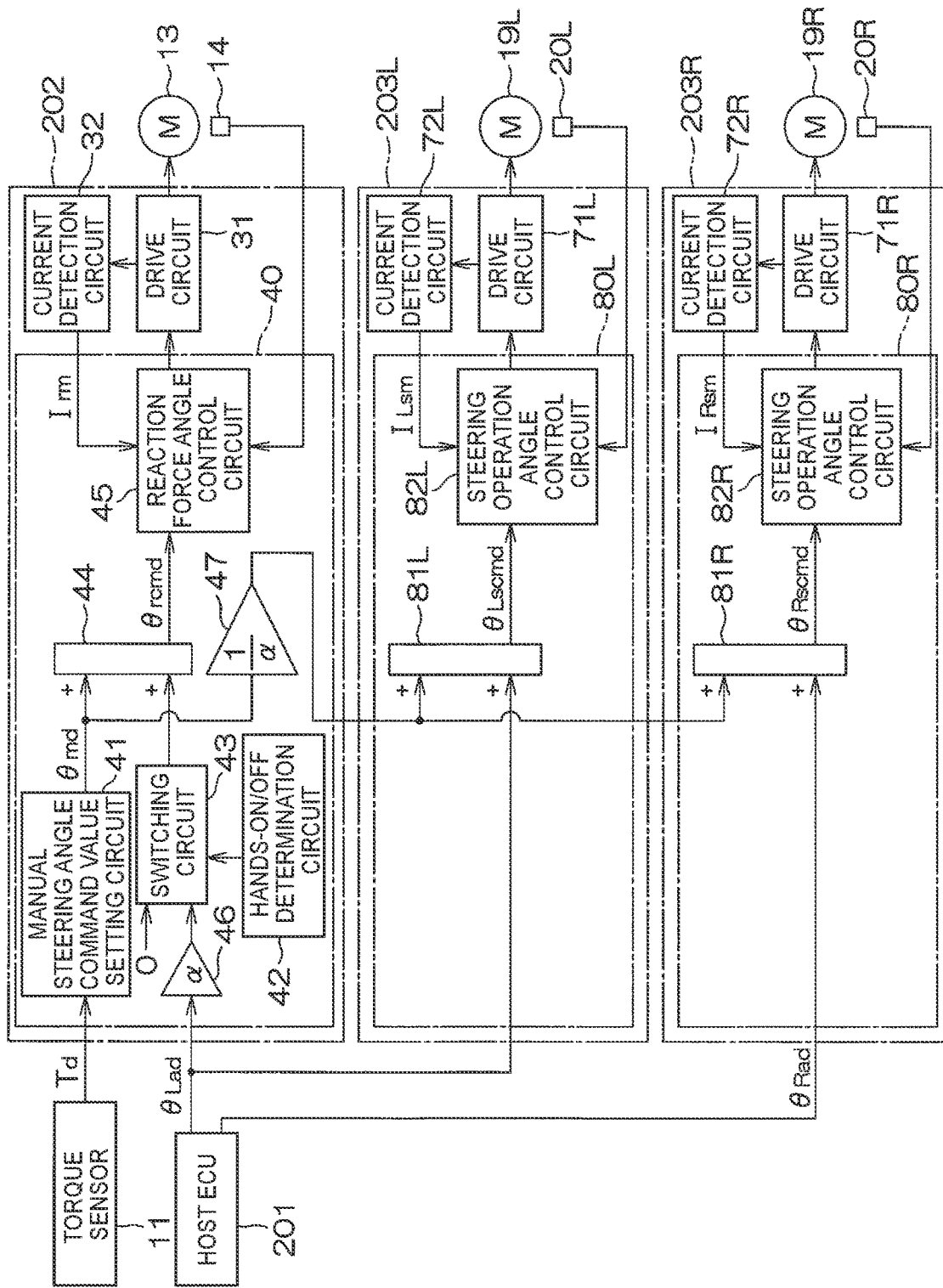
FIG. 9 is a block diagram illustrating the electrical configuration of a reaction force ECU, a left steering ECU, and a right steering ECU.

An output signal of the rotation angle sensor 20R is input to the right steering ECU 203R. The right steering ECU 203R controls the right steering motor 19R based on the output signal of the rotation angle sensor 20R, information received from the reaction force ECU 202, and information received from the host ECU 201. FIG. 9 is a block diagram illustrating the electrical configuration of the reaction force ECU 202, the left steering ECU 203L, and the right steering ECU 203R. In FIG. 9, the portions corresponding to those in FIG. 2 are denoted by the same reference characters as those in FIG. 2.

The electrical configuration of the reaction force ECU 202 is similar to that of the reaction force ECU 202 in FIG. 2. In the reaction force ECU 202 in FIG. 2, the autonomous steering angle command value $\theta_{ad}$ set by the host ECU 201 is input to the switching circuit 43. In the reaction force ECU 202 in FIG. 9, however, the left autonomous steering angle command value $\theta_{Lad}$ multiplied by a coefficient α by an α multiplication circuit 46 is input to the switching circuit 43 instead of the autonomous steering angle command value $\theta_{ad}$. The coefficient α is the ratio of the steering wheel angle to the left autonomous steering angle command value $\theta_{Lad}$ for obtaining an appropriate steering wheel angle (rotation angle of the second shaft 9) corresponding to the left autonomous steering angle command value $\theta_{Lad}$. When the hands-on/off determination circuit 42 determines that the driver is holding the steering wheel 2, the switching circuit 43 outputs the left autonomous steering angle command value $\theta_{Lad}$ multiplied by the coefficient α to the reaction force integrated angle command value calculation circuit 44.

Since the electrical configuration of the left steering ECU 203L is similar to that of the steering ECU 203 in FIG. 2, the portions of the left steering ECU 203L corresponding to those of the steering ECU 203 in FIG. 2 are denoted with the same reference characters as those of FIG. 2 with the letter "L" at the end. Similarly, since the electrical configuration of the right steering ECU 203R is similar to that of the steering ECU 203 in FIG. 2, the portions of the right steering ECU 203R corresponding to those of the steering ECU 203 in FIG. 2 are denoted with the same reference characters as those of FIG. 2 with the letter "R" at the end.

A steering operation integrated angle command value calculation circuit 81L in the left steering ECU 203L calculates a left steering operation integrated angle command value $\theta_{Lscmd}$ by adding a manual steering angle command value $\theta_{md}$ set by the manual steering angle command value setting circuit 41 in the reaction force ECU 202 to the left autonomous steering angle command value $\theta_{Lad}$ set by the host ECU 201. A steering operation angle control circuit 82L controls the angle of the left steering motor 19L based on the left steering operation integrated angle command value $\theta_{Lscmd}$. More specifically, the steering operation angle control circuit 82L controls driving of a drive circuit 71L so that a steered angle $\theta_{Lsp}$ (the rotation angle in the left steering operation mechanism 4L) becomes closer to the left steering operation integrated angle command value $\theta_{Lscmd}$.

A steering operation integrated angle command value calculation circuit 81R in the right steering ECU 203R calculates a right steering operation integrated angle command value $\theta_{Rscmd}$ by adding the manual steering angle command value $\theta_{md}$ set by the manual steering angle command value setting circuit 41 in the reaction force ECU 202 to the right autonomous steering angle command value $\theta_{Rad}$ set by the host ECU 201. A steering operation angle control circuit 82R controls the angle of the right steering motor 19R based on the right steering operation integrated angle command value $\theta_{Rscmd}$. More specifically, the steering operation angle control circuit 82R controls driving of a drive circuit 71R so that a steered angle $\theta_{Rsp}$ (the rotation angle in the right steering operation mechanism 4R) becomes closer to the right steering operation integrated angle command value $\theta_{Rscmd}$.

When the hands-on/off determination circuit 42 determines that the driver is holding the steering wheel 2, a reaction force integrated angle command value $\theta_{rcmd}$ is calculated by adding the manual steering angle command value $\theta_{md}$ to the left autonomous steering angle command value $\theta_{Lad}$ multiplied by the coefficient α, and the reaction force motor 13 is controlled based on the reaction force integrated angle command value $\theta_{rcmd}$. Moreover, the left steering operation integrated angle command value $\theta_{Lscmd}$ is calculated by adding the manual steering angle command value $\theta_{md}$ divided by the coefficient α in an α division circuit 47 to the left autonomous steering angle command value $\theta_{Lad}$, and the left steering motor 19L is controlled based on the left steering operation integrated angle command value $\theta_{Lscmd}$. The right steering operation integrated angle command value $\theta_{Rscmd}$ is also calculated by adding the manual steering angle command value $\theta_{md}$ divided by the coefficient α in the α division circuit 47 to the right autonomous steering angle command value $\theta_{Rad}$, and the right steering motor 19R is controlled based on the right steering operation integrated angle command value $\theta_{Rscmd}$.

The driver's intention can thus be immediately reflected in the reaction force motor 13, the left steering motor 19L, and the right steering motor 19R during autonomous steering control. Accordingly, cooperative control can be implemented which allows manual steering to be performed while performing steering control (steering operation control and reaction force control (steering wheel angle control)) mainly by autonomous steering control without switching steering control between manual steering control and autonomous steering control. Since steering control can be seamlessly shifted between manual steering control and autonomous steering control, the driver will not feel discomfort during manual steering.

When the hands-on/off determination circuit 42 determines that the driver is not holding the steering wheel 2, zero is input to the reaction force integrated angle command value calculation circuit 44 as the left steering operation integrated angle command value $\theta_{Lscmd}$. In this case, the reaction force motor 13 is controlled based on the reaction force integrated angle command value $\theta_{rcmd}$ consisting only of the manual steering angle command value $\theta_{md}$. Since the manual steering angle command value $\theta_{md}$ is approximately zero in this case, the steering wheel 2 is fixed at the neutral position during autonomous steering. This configuration can thus avoid such a situation that the steering wheel 2 is rotated by autonomous steering and the driver is caught by the steering wheel 2 when he/she is not holding the steering wheel 2.

In the first embodiment, the host ECU 201 outputs the same autonomous steering angle command value $\theta_{ad}$ to the reaction force ECU 202 and the steering ECU 203. However, the host ECU 201 may individually set the autonomous steering angle command value for the reaction force motor 13 and the autonomous steering angle command value for the steering motor 19 and output these autonomous steering angle command values to the corresponding ECUs 202, 203. Similarly, in the second embodiment, the host ECU 201 outputs the same left autonomous steering angle command value $\theta_{Lad}$ to the reaction force ECU 202 and the left steering ECU 203L. However, the host ECU 201 may individually set the autonomous steering angle command value for the reaction force motor 13 and the autonomous steering angle command value for the left steering motor 19L and output these autonomous steering angle command values to the corresponding ECUs 202, 203L. The hands-on/off determination circuit 42 may determine whether the driver is steering the steering wheel 2, and the reaction force autonomous steering angle command value may be set to zero when the hands-on/off determination circuit 42 determines that the driver is not steering the steering wheel 2.

The disclosure is also applicable to, e.g., steer-by-wire systems using a four-wheel steering system in which front wheels and rear wheels are independently steered. In this case, steering ECUs are provided for the front wheels and the rear wheels. The disclosure is also applicable to steer-by-wire systems using a four-wheel independent steering operation system in which four wheels are independently steered. In this case, a steering ECU is provided for each wheel.

Various design modifications can be made to the disclosure within the scope of the claims.

What is claimed is:

1. A steering system comprising:
    a steering member;
    a steering operation mechanism mechanically separated from the steering member;
    a reaction force motor configured to apply reaction torque to the steering member;
    a steering motor configured to drive the steering operation mechanism;
    a steering torque sensor configured to detect steering torque applied to the steering member; and
    an electronic control unit configured to:
        set a manual steering angle command value based on the steering torque;
        calculate a reaction force command value based on a reaction force steering angle command value and the manual steering angle command value,
        calculate a steering operation command value based on a steering operation steering angle command value and the manual steering angle command value,
        cause a rotation angle of the reaction force motor to follow the reaction force command value, and
        cause a rotation angle of the steering motor to follow the steering operation command value.

2. The steering system according to claim 1, wherein the electronic control unit is configured to:
    determine whether the steering member is being steered; and
    set the reaction force steering angle command value to zero when the electronic control unit determines that the steering member is not being steered.

3. The steering system according to claim 1, wherein the reaction force steering angle command value and the steering operation steering angle command value are a common autonomous steering angle command value.

4. The steering system according to claim 1, wherein:
    the steering operation mechanism includes a first steering operation mechanism configured to steer a first steered wheel and a second steering operation mechanism configured to steer a second steered wheel;
    the steering motor includes a first steering motor that drives the first steering operation mechanism and a second steering motor that drives the second steering operation mechanism; and
    the electronic control unit is configured to:
        calculate a first steering operation command value based on the manual steering angle command value and a first steering operation steering angle command value for steering the first steered wheel,
        calculate a second steering operation command value based on the manual steering angle command value and a second steering operation steering angle command value for steering the second steered wheel,
        cause a rotation angle of the first steering motor to follow the first steering operation command value, and
        cause a rotation angle of the second steering motor to follow the second steering operation command value.

5. The steering system according to claim 1, wherein the electronic control unit is configured to:
    determine whether a driver is holding the steering member; and
    set the reaction force steering angle command value to zero when the electronic control unit determines that the driver is not holding the steering member.

* * * * *